Feb. 9, 1960   W. A. TITTERINGTON   2,924,424
TEMPERATURE COMPENSATED BUTTERFLY VALVE
Filed Nov. 17, 1955
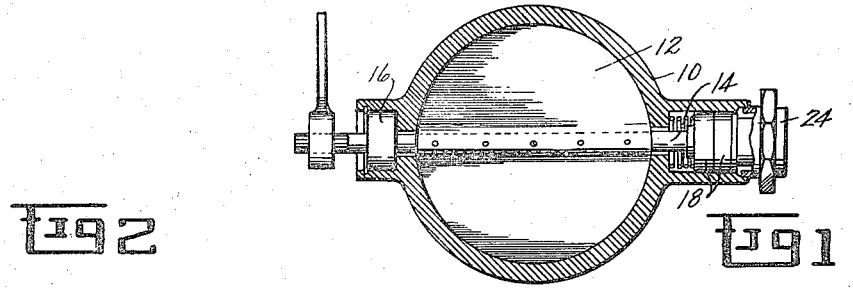
Fig. 1
Fig. 2
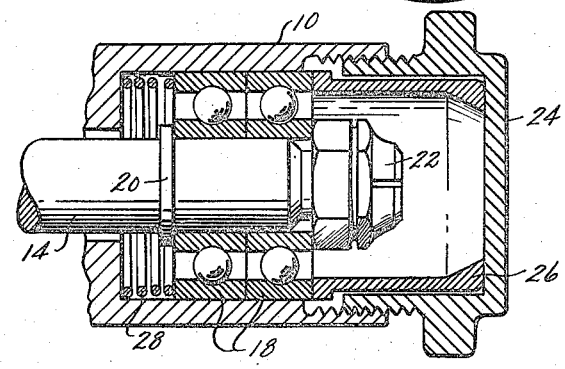
Fig. 3
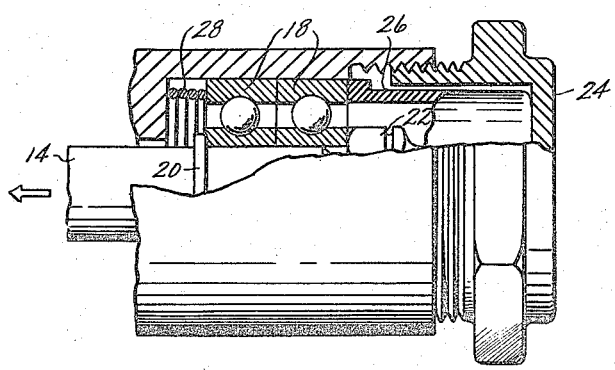
INVENTOR.
WILLIAM A. TITTERINGTON
BY
Edward M. Tritle
HIS ATTORNEY

United States Patent Office 2,924,424
Patented Feb. 9, 1960

2,924,424

TEMPERATURE COMPENSATED BUTTERFLY VALVE

William Alexander Titterington, Danvers, Mass., assignor to General Electric Company, a corporation of New York Application November 17, 1955, Serial No. 547,365

6 Claims. (Cl. 251—305)

The present invention relates to butterfly valves and more particularly to a butterfly valve with temperature compensation means. The ordinary butterfly valve comprises a disk-shaped member or "butterfly" mounted on a rotatable shaft across the bore of a cylindrical housing. In this kind of valve, it is common to make the valve body from one material and the butterfly and its shaft from another material. Each material has a different coefficient of linear expansion. This difference in expansion is further complicated by the uneven temperature distribution when high temperature fluids pass through the valve. The ultimate result of the effect of such fluids on the different materials of construction of the valve is not only a different rate of expansion of each of the parts, but also an uneven rate of expansion for any one part. Since the casing of such a valve tends to radiate more heat at a point farthest from the heavier areas, the valve casing in the area of the bearings for the shaft of the butterfly will be hotter than the valve casing on a plane perpendicular to the shaft. The result of such a thermal difference is the distortion of the valve casing into an elliptical shape (with its long axis perpendicular to the shaft) rather than the desired circular shape. In order to prevent interference of the butterfly disk with the casing at a point on a plane perpendicular to the shaft, it is necessary to choose a material for the casing which will expand at a higher rate than will the butterfly and its shaft. As the valve casing expands in this manner, the casing in the area of the bearings expands as does the shaft. However, since one end of the shaft is restricted from moving outwardly and because the casing, for the reasons described above, must have a greater rate of linear expansion than does the butterfly and its shaft. the casing will tend to approach the butterfly in the area of the partially fixed bearing, taking up any clearance therebetween. Meanwhile, at the other or unfixed bearing, the casing will expand faster than the butterfly and its shaft and therefore will move away from and widen the clearance between the butterfly and the casing. That is, the center of the butterfly will be relatively closer to the partially fixed bearing than will the center of the casing cross section. This complicated expansion pattern results in an uncentered condition of the butterfly within the casing which, in turn, results in an imperfect seal with attendant leakage and erosion. In extreme cases the butterfly will actually bind on the casing in the area of the partially fixed bearing thus preventing complete valve closure. In some applications, such as where the butterfly valve is used to control the supply of motive fluid to airborne turbine drives for aircraft accessories, the fluid temperatures which the valve is required to handle may vary as much as from —65° F. to 750 F. In addition, since it is important to minimize leakage in this type of application, the accuracy of centering a butterfly of approximately four inches in diameter must often be within .0005 inch. Accordingly, an object of the present invention is to provide a temperature compensated butterfly valve in which the butterfly remains centered accurately in the valve body bore over extreme ranges of temperatures.

Briefly this and other objects are obtained by providing a temperature compensator which moves the shaft on which the butterfly is mounted with changing temperature to compensate for differential thermal expansion of the parts and to maintain the butterfly centered with respect to the bore of the valve body.

The invention will be better understood from the following description taken in connection with the accompanying drawing in which:

Fig. 1 is an end view of a butterfly valve provided with temperature compensation in accordance with the present invention;

Fig. 2 is an enlarged cross-sectional view of the temperature compensator showing the parts positioned as they would be at a relatively low temperature; and Fig. 3 is an enlarged view of the apparatus shown in Fig. 2 partly in section showing the parts as they would be under the influence of a relatively high temperature.

Referring to Fig. 1, the butterfly valve comprises a casing or body 10 including a cylindrical internal bore in which a butterfly 12 is mounted for rotation. The butterfly 12 is carried by a shaft 14 which is either integral therewith or rigidly fastened thereto. The shaft 14 is rotatably mounted in a pair of bearings 16 and 18 which are supported by the valve casing 10. The bearing 16 is of the roller or any other common type which permits longitudinal motion of the shaft 14 with respect to the casing 10. The bearing means 18 comprise two direction thrust bearings which are indicated in the drawing as a pair of ball bearings. The bearings 18 are held in place with respect to the shaft 14 between collar 20 on a shaft and a nut 22 which is threaded on a threaded end portion of the shaft 14. The bearings 18 and the shaft 14 which carries them are positioned relative to the valve casing 10 by means of an adjusting cap 24 which is threaded into the end of the portion of the valve body 10 which retains the bearing means 18. A temperature compensating collar 26 is formed of sintered aluminum or any other suitable material having a high co-efficient of thermal expansion which collar is located between the adjusting cap 24 and the bearing means 18. Bearing against the bearing means 18 is a spring shown in the drawing as a helical spring 28 which forces the bearing means 18 and compensator collar 26 firmly against the inside of the adjusting cap 24. In place of the helical spring 28, a Belleville washer can be used if desired. In this manner the shaft 14 is prevented from moving in the direction of cap 24 but may only move in the direction of bearing 16.

When the butterfly 12 is assembled in the valve body 10, the butterfly valve is centered with respect to the bore portion of the body by means of the adjusting cap 24 which moves the shaft 14 longitudinally with respect to the casing 10 to the desired position. Fig. 2 shows the relative position of the parts when they are at room or a relatively low temperature. When the temperature of the parts increase, the casing 10 begins to take up the clearance between itself and the butterfly 12 on the side nearest bearing 18 while the casing 10 begins to increase the clearance between itself and the butterfly 12 on the side nearest the bearing 16. If not compensated, this action would result in the uncentered condition as described above. However, the high co-efficient of thermal expansion of the compensating collar 26 causes the compensating collar to expand more rapidly than the surrounding valve parts so that the bearing means 18 and consequently the shaft 14 will be moved to the left against a biasing force of the spring 28 to the position shown in Fig. 3. Motion of the butterfly 12 to the left in this manner compensates for the difference in growth between valve disk and bore to recenter the valve in the bore of the casing 10. Thus when the valve is closed, a uniform seal is obtained around its periphery as it is shown in Fig. 1 regardless of the temperature of the apparatus.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. A fluid valve comprising a valve casing, a disk-shaped member within said casing carried by a shaft extending across said casing and mounted for rotation in bearing means supported by said casing, said bearing means being movable with said shaft relative to said casing, spacing means between said shaft and said casing formed of a material having a co-efficient of thermal expansion differing from that of said valve casing and shaft, said spacing means engaging said bearing means to position said shaft to compensate for thermal expansion of said valve casing and shaft relative to said casing, and means biasing said shaft toward said spacing means.

2. A fluid valve comprising a valve casing, a disk-shaped member within said casing carried by a shaft extending across said casing and mounted for rotation, first and second bearing means carried by said casing on opposite sides thereof, said first bearing means being enclosed by a cup-shaped housing carried by said casing, said first bearing means being movable with said shaft within said cup-shaped housing, temperature compensating means within said cup-shaped housing comprising a sleeve member of a material having a co-efficient of thermal expansion different from that of the material from which said cup-shaped housing is formed and located between said bearing means and the closed end of said housing, and means biasing said shaft toward said sleeve member.

3. In a fluid valve comprising a valve casing and a disk-shaped member therein mounted on a shaft extending across said valve casing, a bearing structure for said shaft comprising a cup-shaped housing carried by said casing and enclosing one end of said shaft, thrust bearing means surrounding said shaft so as to move axially therewith, said thrust bearing means being movable axially with said shaft within said cup-shaped housing, biasing means between said casing and said thrust bearing means to bias said bearing means toward the closed end of said cup-shaped housing, and spacing means extending between and engaging the closed end of said cup-shaped housing and said bearing means said spacing means being formed of a material having a high co-efficient of thermal expansion in relation to that of cup-shaped housing to maintain said disk-shaped member centered in said valve casing under varying temperatures.

4. Apparatus in accordance with claim 3 wherein said cup-shaped housing comprises an adjusting portion in threaded relation with the remainder of said housing and engaging said spacing means for adjusting the position of said shaft relative to said casing.

5. A fluid valve comprising a valve casing, a disk-shaped member within said casing and carried by a shaft extending across said casing and mounted for rotation in bearing means supported by said casing, said bearing means being movable axially with said shaft relative to said casing, a spacing member extending between and engaging said bearing means and said casing, said spacing member being composed of a material having a different co-efficient of thermal expansion from that of said casing, and means biasing said shaft toward said spacing member.

6. A fluid valve comprising a valve casing, a disk-shaped member within said casing and carried by a shaft extending across the casing and mounted for rotation in bearing means supported by said casing, a cup-shaped housing supported by said casing and enclosing one end of said shaft, a spacing member within said cup-shaped housing made from a material having a co-efficient of thermal expansion differing from that of said housing and adapted to transmit a force to said shaft, said bearing means being movable axially with said shaft relative to said casing, and biasing means for biasing said shaft towards said spacing member.

References Cited in the file of this patent

UNITED STATES PATENTS

| 2,180,136 | Bates | Nov. 14, 1939 |
| 2,751,186 | Glier | June 19, 1956 |